(12) United States Patent
Iwashita et al.

(10) Patent No.: US 7,293,447 B2
(45) Date of Patent: Nov. 13, 2007

(54) CONTROL DEVICE FOR DIE CUSHION MECHANISM

(75) Inventors: Yasusuke Iwashita, Fujiyoshida (JP); Tadashi Okita, Fujiyoshida (JP); Yukio Toyozawa, Kumamoto (JP); Naoto Sonoda, Kumamoto (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/282,683

(22) Filed: Nov. 21, 2005

(65) Prior Publication Data

US 2006/0107724 A1 May 25, 2006

(30) Foreign Application Priority Data

Nov. 22, 2004  (JP)  ............... 2004-337472

(51) Int. Cl.
*B21J 9/18* (2006.01)
(52) U.S. Cl. ............... 72/454; 72/20.2; 72/21.4; 72/441
(58) Field of Classification Search ............... 700/206; 72/31.05
See application file for complete search history.

(56) References Cited

U.S. PATENT DOCUMENTS 4,565,081 A * 1/1986 Massee ............... 72/20.2
5,275,031 A * 1/1994 Whiteside et al. ............... 72/17.3
5,435,166 A * 7/1995 Sunada ............... 72/351

FOREIGN PATENT DOCUMENTS

JP   A-10-202327   8/1998

* cited by examiner

*Primary Examiner*—Derris H. Banks
*Assistant Examiner*—Debra M Wolfe
(74) *Attorney, Agent, or Firm*—Drinker Biddle & Reath LLP

(57) ABSTRACT

A control device for a die cushion mechanism, for carrying out force control with high accuracy and at a high speed. The control device for controlling the force generated by the die cushion mechanism utilizes a press working cycle which is repeatedly carried out. A correcting part of the control device corrects each deviation in one working cycle based on a time-series of deviation data in the just before press working cycle. By repeating this operation, the deviation between the detected value and the commanded value may be converged toward zero. Therefore, the deviation may become smaller than that of the conventional feedback control, whereby it is possible to respond to a change in the commanded value in a short time.

3 Claims, 4 Drawing Sheets

CONTROL DEVICE FOR DIE CUSHION MECHANISM

BACKGROUND OF THE INVENTION

1. Field of the Invention

The present invention relates to a control device for a die cushion mechanism and, in particular, to a control device for controlling a force generated by a die cushion mechanism of a press machine.

2. Description of the Related Art

It is known that a press machine, for press working such as bending, drawing or punching, is provided with a die cushion mechanism as an attached device for applying a predetermined force or pressure, during the press working, to a movable support member (generally called a slide) supporting a first mold for press working, the force being generated by another movable member supporting a second mold. The die cushion mechanism is generally configured such that the slide (or the first mold), moving in a mold-clamping direction, directly or indirectly collides with a movable element (generally called as a cushion pad) held at a predetermined pressure and, until the molding is finished, the cushion pad is moved with the slide while applying force or pressure to the slide. During this operation, it is possible to prevent the occurrence of a wrinkle in a workpiece to be pressed by, for example, clamping an area around a site, of the workpiece, to be pressed between the cushion pad and the slide.

Many conventional die cushion mechanisms use a hydraulic or a pneumatic unit as a driving source. However, the control by the hydraulic or the pneumatic unit may be carried out only under a constant pressure. It is preferable that the pressure during drawing is varied corresponding to the amount of the drawing, however, the pressure cannot be varied in the hydraulic or the pneumatic unit.

In recent years, therefore, a die cushion mechanism using a servomotor as a driving source has been used to carry out force control with a high response, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall motions of the slide. The servomotor is activated by a predetermined force command corresponding to the position of the cushion pad and adjusts the force or pressure applied, to the slide, by the cushion pad while moving the cushion pad with the slide. The collision of, and pressure between, the slide and the cushion pad may be determined by detecting a load applied to an output axis of the servomotor via the cushion pad.

In recent press working, it is desired to carry out the press working with a higher accuracy, and at a high speed, in order to improve the productivity. By using the above servomotor, it is possible to reduce an impact force during a collision and vary the pressure during drawing. However, when the speed of the slide is increased, the impact force is increased and a large force is applied to the die cushion mechanism, as the force control cannot follow the increased impact force, resulting in that a deviation or a difference between a commanded value and a detected value of the force becomes larger. Also, when the rigidity of members constituting the die cushion mechanism is relatively high, the impact force and the deviation becomes larger. Further, the variation of the pressure during drawing is relatively large, the deviation during drawing may be larger. Due to the large deviation, it is difficult to obtain a desirable pressure and carry out the press working with a high accuracy.

SUMMARY OF THE INVENTION

Therefore, an object of the present invention is to provide a control device of a die cushion mechanism capable of carrying out the force control with high speed and high accuracy, so as to resolve the above problems.

According to the present invention, there is provided a control device of a die cushion mechanism of a press machine, for generating a force applied to a slide of the press machine by using a servomotor as a driving source, the control device comprising: a force commanding part for outputting a commanded force value to be generated by the die cushion; a force detecting part for detecting a force generated by the die cushion mechanism based on the commanded force value; a force controlling part for controlling the servomotor based on the deviation between the commanded force value and a detected force value detected by the force detecting part; and a correcting part for correcting a time-series of the deviation, obtained during the force control in a first press working cycle carried out by the force controlling part, when the force controlling part carries out the force control in a second press working cycle next to the first cycle.

The correcting part may comprise a learning control part for calculating a correction value based on the deviation in the first press working cycle and an arithmetic part for adding the correction value to the deviation in the second press working cycle.

The correcting part may input the deviation at every predetermined sampling period and output the correction value. Alternatively, the correcting part may input the deviation at every predetermined position of the slide and output the correction value.

BRIEF DESCRIPTION OF THE DRAWINGS

The above and other objects, features and advantages of the present invention will be made more apparent by the following description of the preferred embodiments thereof, with reference to the accompanying drawings wherein.

DETAILED DESCRIPTION

The present invention is explained below with reference to drawings.

Figure 1:
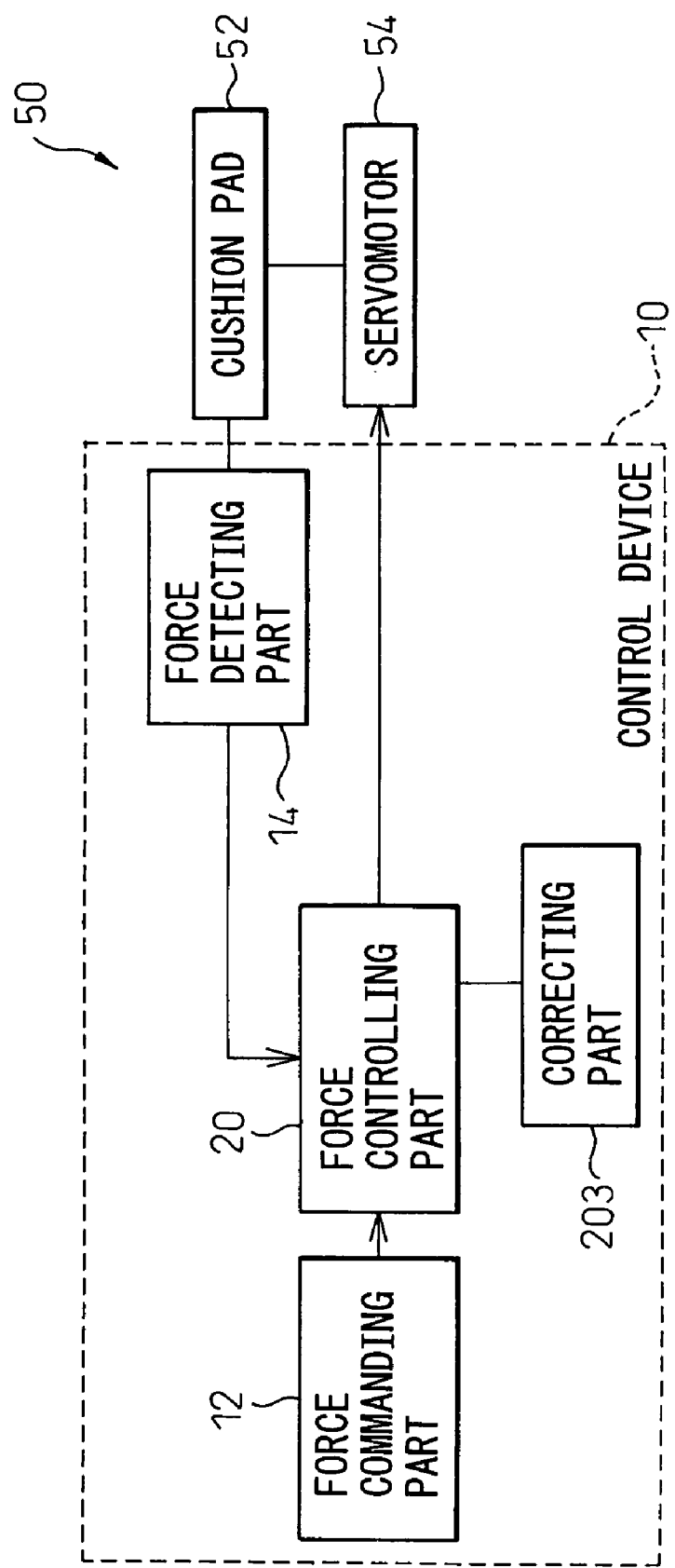
FIG. 1 is a functional block diagram showing a basic configuration of a control device of the invention.
Figure 2:
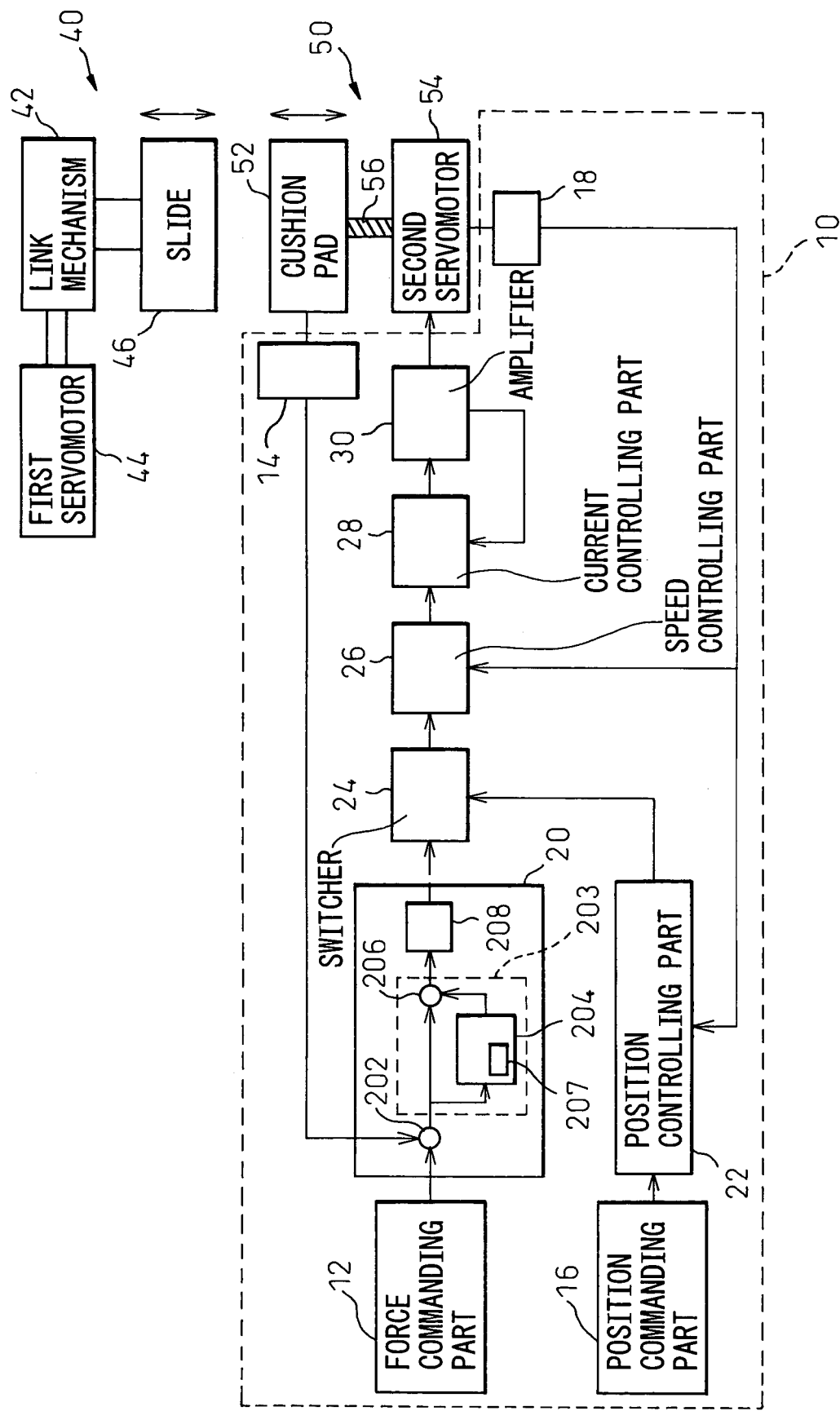
FIG. 2 is a diagram of a constitution of a press machine including a control device of a first embodiment of the invention.

FIG. 1 is a functional block diagram showing a basic configuration of a control device 10 of the invention and FIG. 2 is a diagram of a preferred constitution of a press machine 40 including a control device 10 of a first embodiment of the invention. The press machine 40 has a slide 46 driven by a first servomotor 44 via a suitable link mechanism 42 and a die cushion mechanism 50 for capable of generating a force or a pressure against the slide 46. The die cushion 50 includes a cushion pad 52 configured to move corresponding the motion of the slide 46, a second servomotor 54 for driving the cushion pad 52 and a control device 10 for controlling the second servomotor 54 such that a force or a pressure between the cushion pad 52 and the slide 46. The slide 46 supports a first mold (not shown) used for a press machining and moves toward to or away from a second mold (not shown) with a required speed for the press machining. The cushion pad 52 is positioned and associated with the second mold and connected to an output shaft of the second servomotor 54 via, for example, a ball screw device 56.

The control device 10 is used for the die cushion mechanism 50 generating the force against the slide 46 of the press machine 40 by means of the second servomotor 54 as a driving source. The control device 10 includes: a force commanding part 12 for commanding the die cushion 50 to generate a commanded force; a force detecting part or a force sensor 14 for detecting the force generated by the die cushion mechanism 50; a position commanding part 16 for commanding the position of the second servomotor 54; a first detecting part 18 for detecting the position and the speed of the second servomotor 54; a force controlling part 20 for controlling the second servomotor 54 based on the commanded force by the force commanding part 12 and the detected force detected by the force sensor 14; a position controlling part 22 for controlling the position of the second servomotor 54 based on the commanded position by the position commanding part 16 and the detected position detected by the first detecting part 18; and a switcher 24 for alternately switching a commanded force value by the force controlling part 20 and a commanded position value by the position controlling part 22. The control device 10 further includes: a speed controlling part 26 for controlling the speed of the second servomotor 54 based on a commanded speed value by the switcher 24 and a detected speed value detected by the first detecting part 18; a current controlling part 28, controlled by the speed controlling part 26, for controlling a current value of the second servomotor 54; and an amplifier 30, controlled by the current controlling part 28, for supplying current to the second servomotor 54.

As shown in FIG. 2, the force controlling part 20 has a first arithmetic part 202 for calculating a force deviation or a difference between the commanded force value outputted by the force commanding part 12 and the detected force value detected by the force sensor 14 and a correcting part 203 for correcting the deviation in one press working cycle, based on the deviation in a closest before press working cycle calculated by the first arithmetic part 202, when the force controlling part 20 controls the second servomotor 54. In detail, as shown in FIG. 2, the correcting part 203 includes a learning process part 204 for calculating a correction value by the force deviation and a second arithmetic part 206 for adding the correction value to the force deviation. After the second arithmetic part 206 adds the correction value to the force deviation, the deviation is multiplied by a suitable constant at a gain 208 and sent to the above switcher 24.

The present invention utilizes repeated executions of the same cycle including: collision of the first and second molds of the slide 46 in which one of the mold collides with the other directly or indirectly interposing a workpiece to be pressed; clamping or drawing of the two molds; and opening the molds or separating one of the mold from the other. In a first embodiment described hereinafter, the force deviation is calculated at a predetermined interval in each press working cycle. On the other hand, in second and third embodiments described below, the force deviation is calculated corresponding to (or synchronizing with) the position of the slide 46 in each press working cycle.

Next, the function of the force controlling part 20 in the first embodiment is explained.

First, in a first press working cycle, a feedback control is carried out such that the die cushion 50 generates a predetermined force. At this point, samples of detected force values detected by the force sensor 14 in the first press working cycle are selected by the first arithmetic part 202 at a predetermined interval. The first arithmetic part 202 calculates a time-series of deviation between the sampled detected force values and the commanded force values by the force commanding part 12 and sends the time-series of deviations to the learning process part 204. The learning process part 204 reduces the noise in the deviation using, for example, a low-pass filter for removing a high-frequency component of the deviation and, then, stores the filtered deviation in a suitable memory 207.

In a second press working cycle, the learning process part 204 calculates each correction value by using each deviation of the first press working cycle stored in the memory 207 and adds the correction value to each deviation of the second press working cycle. For example, a deviation obtained by a n+1-th sampling in the first cycle corresponds to the correction value for a deviation obtained by a n-th sampling in the second cycle. Concretely, when deviations (or a commanded value—a detected value) obtained by n-th and n+1-th samplings in the first cycle are 5 kg and −2 kg, respectively, the correction value for a deviation obtained by a n-th sampling in the second cycle is equal to the deviation by the n+1-th sampling in the first cycle, i.e., −2kg. Therefore, if the deviation obtained by the n-th sampling in the second cycle is 4 kg, a deviation sent to the gain 208 is equal to 2 kg, which is a summation of the deviation (=4 kg) and the correction value (=−2 kg). In a feedback control of the prior art, the deviation sent to the gain is still 4 kg. In this way, by adding the correction value to the deviation, the deviation may approach zero in comparison with the feedback control of the prior art, in which the deviation may diverge or overshoot. By repeating the above process at every press working cycle, all deviations sampled in one cycle may converge to zero. Therefore, it is possible to make the change of the commanded value correspond in a short time and press working with high accuracy may be performed.

Although the n+1-th deviation in one cycle may be equal to the correction value for the n-th deviation in next cycle, it is possible to multiply the n+1-th deviation by a suitable constant less than 1 (for example, 0.5-0.8), in order to stabilize the convergence or prevent the divergence of the deviation. Also, the correction value is added to the deviation after filtering for the phase-progress of the correction value corresponding to the time lag in relation to a response of the commanded servomotor.

Figure 3:
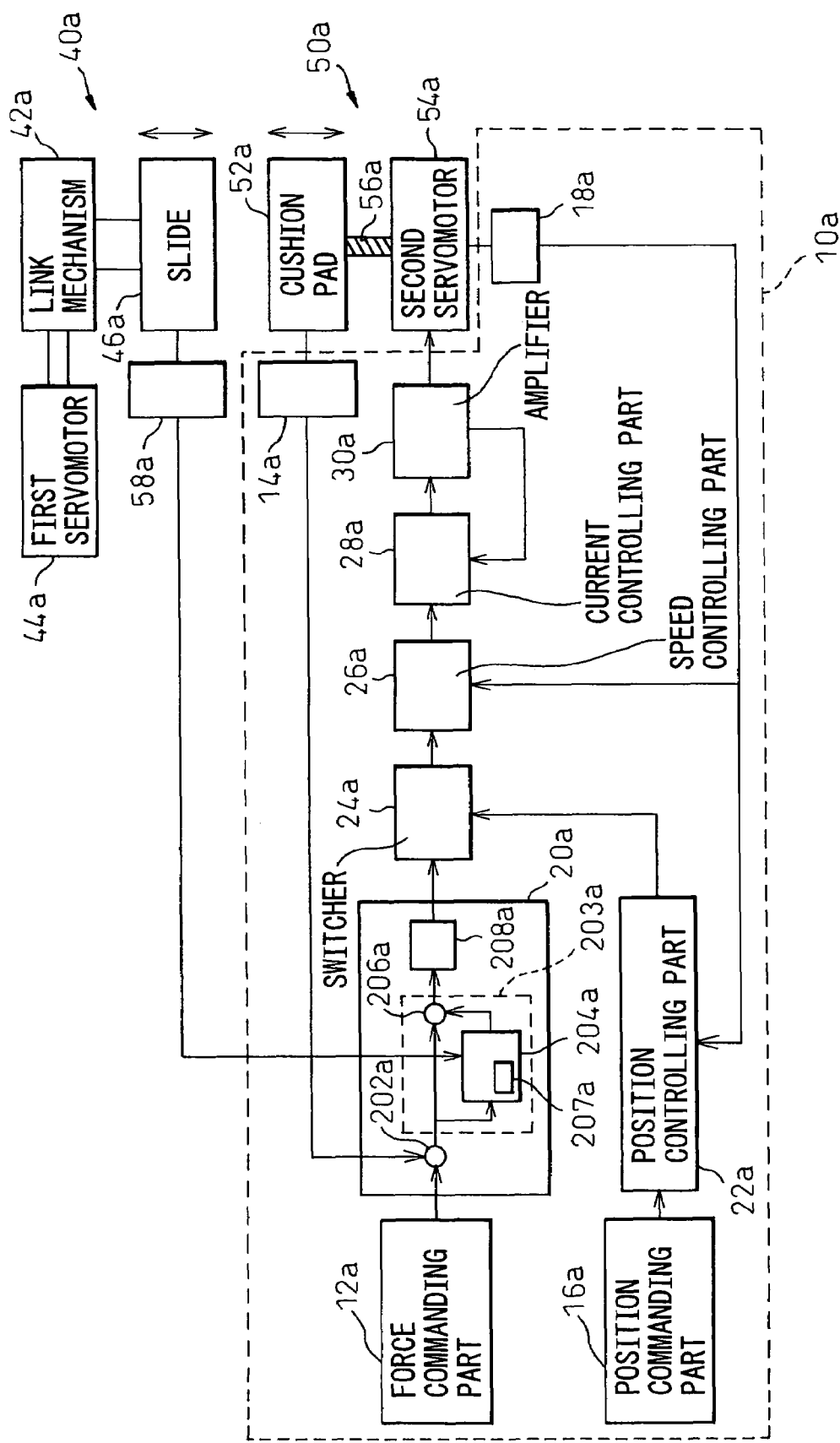
FIG. 3 is a diagram of a constitution of a press machine including a control device of a second embodiment of the invention.

FIG. 3 shows a configuration of press machine 40a including a control device 10a according to a second embodiment of the invention. The press machine 40a further includes a linear scale 58a for detecting the position of a slide 46a. A detected value or a detecting signal from the linear scale 58a is sent to a learning control part 204a. As the other constitutions of this embodiment may be the same as that of the first embodiment, a detailed description is omitted. In this connection, a character "a" is added to the end of each numeral of a component of the second embodiment similar to that of the first embodiment.

In the above first embodiment, a plurality of detected force values, to be processed by the learning control part

204, are sampled at every predetermined period in a series of press working cycle. In the second embodiment, on the other hand, the learning control part 204a uses a plurality of detected force values each detected corresponding to each position of the slide 46a in the press working cycle. A method for processing the plurality of detected values using the learning control part 204a may be the same as the method using the learning control part 204 of the first embodiment. Therefore, the deviation may also become smaller than that of the conventional feedback control, whereby it is possible to correspond to the change of the commanded value in a short time.

Figure 4:
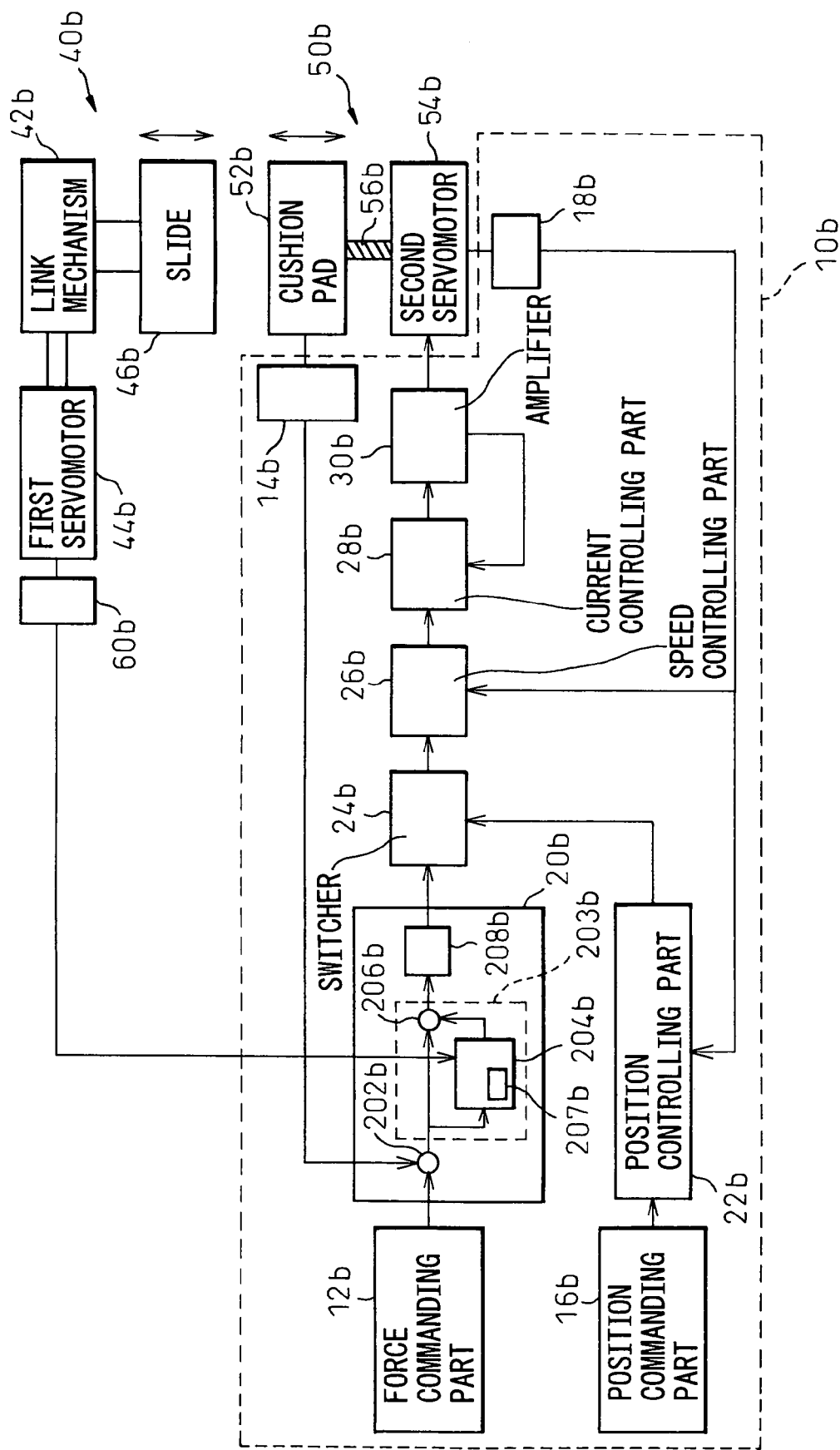
FIG. 4 is a diagram of a constitution of a press machine including a control device of a third embodiment of the invention.

FIG. 4 shows a configuration of press machine 40b including a control device 10b according to a third embodiment of the invention. This embodiment is different from the second embodiment in that the third embodiment has a second detecting part 60b attached to a first servomotor 44b, instead of the linear scale, for detecting the position of a slide 46b. Therefore, in the third embodiment, a detected value or a detecting signal from the second detecting part 60b is sent to a learning control part 204b. The function of the learning control part 204b may be the same as that of the learning control part 204a of the second embodiment. As the other constitutions of this embodiment may be the same as that of the first embodiment, a detailed description is omitted. In this connection, a character "b" is added to the end of each numeral of a component of the third embodiment similar to that of the first embodiment.

According to the control device of the die cushion mechanism of the present invention, it is possible to reduce the deviation of the detected force value, relative to the commanded force value, by correcting the deviation in one working cycle using the deviation data in the just before working cycle, whereby a force control with a high accuracy and a high speed may be performed.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device of a die cushion mechanism of a press machine, for generating a force applied to a slide of the press machine by using a servomotor as a driving source, the control device comprising:

a force commanding part for outputting a commanded force value to be generated by the die cushion;

a force detecting part for outputting a detected force value generated by the die cushion mechanism based on the commanded force value;

a force controlling part for controlling the servomotor based on deviation between the commanded force value and the detected force value; and a correcting part for correcting a time-series of the deviation, obtained during the force control in a first press working cycle carried out by the force controlling part, when the force controlling part carries out the force control in a second press working cycle next to the first cycle, wherein the correcting part includes a learning control part for calculating a correction value based on the deviation in the first press working cycle and an arithmetic part for adding the correction value to the deviation in the second press working cycle, and wherein the learning control part includes a low-pass filter for removing a high-frequency component of the deviation and a phase-progress filter for progressing the correction value corresponding to the time lag in relation to a response of the commanded servomotor.

2. The control device as set forth in claim 1, wherein the correcting part inputs the deviation at every predetermined sampling period and outputs the correction value.

3. The control device as set forth in claim 1, wherein the correcting part inputs the deviation at every predetermined position of the slide and outputs the correction value.

\* \* \* \* \*